Oct. 22, 1974   P. H. KWAN   3,843,507

SCALE INHIBITING APPARATUS

Filed Nov. 29, 1972

3,843,507
SCALE INHIBITING APPARATUS
Philip Henry Kwan, South Pasadena, Calif., assignor to
Key II Industries, Camarillo, Calif.
Filed Nov. 29, 1972, Ser. No. 310,240
Int. Cl. B03c 5/02; C02b 1/82
U.S. Cl. 204—302                                4 Claims

ABSTRACT OF THE DISCLOSURE

A conductive probe is placed in the path of flowing water and connected to receive an oscillating voltage wave form which alternates in polarity. The probe is thus charged alternately positively and negatively at a given frequency thereby inhibiting charged ions of minerals in the water from adhering to the inner walls of water pipes so that the build up of scale is inhibited.

---

This invention relates to an apparatus for inhibiting scale formation on the interior walls of water pipes.

BACKGROUND OF THE INVENTION

In all piping systems carrying natural water, there is a tendency for scale to build up on the interior wall of the pipes. Such scale formation is comprised mostly of calcium deposits although other ions of minerals in the flowing water contribute towards scale build up.

The foregoing problem of scale build up is particularly aggravating in water pipe lines to boilers since clogging of the lines can cause seirous interference with operation of the boilers. Further, heated water tends to accelerate the deposit of undesirable mineral compounds on the interior walls of the piping system.

Another problem area is that of sprinkler systems wherein deposits of mineral compounds on the pipes can actually clog the sprinklers by eventually breaking loose. Moreover, the effectively reduced inner diameter of the pipe as a consequence of scale formation greatly reduces the necessary pressure for operation of such sprinkler systems.

In the past, many descaling systems have been proposed. By far the most commonly used expedient is to introduce a chemical solution into the water which will help to prevent scale deposits. The introduction of chemical solutions however can result in disadvantages. As one example, the water is adulterated by the introduced chemical and depending on its end use, such adulteration may be undesirable. Other proposed remedies to inhibit scaling have involved ultrasonic cleaning techniques wherein a magnetostriction device in the form of a probe is introduced into the water path and ultrasonic vibrations generated. By a cavitation method, scale is shaken loose or at least partially inhibited from forming. These latter types of ultrasonic "cleaners" involve high ultrasonic frequency generation and sufficient power to establish the necessary physical vibrations to set up a "cavitation." When these ultrasonic systems are used, scale already formed on the pipes is often shaken loose and is simply carried in the stream as particles which can clog subsequent equipment connected to the water lines.

BRIEF DESCRIPTION OF THE PRESENT INVENTION

Bearing the foregoing in mind, it is a primary object of the present invention to provide an improved apparatus for inhibiting scale formation on water pipes which avoids the use of chemicals or ultrasonic type systems.

More particularly, the water flow in the pipes is treated by subjection to a low frequency wave form of alternating polarity in such a manner that charged ions of minerals in the water are inhibited from adhering to the inner walls of the water pipes so that the build up of scale is inhibited. Effectively, the minerals are retained in solution in the water rather than depositing on the interior walls of the pipes so that the risk of clogging by loose particles in the water stream is reduced. Moreover, the water itself is in no way adulterated since no chemicals are introduced.

The apparatus is economical and compact. Essentially, it comprises a control box incorporating means for generating an oscillating voltage wave form of given low frequency which alternates in polarity. A pipe section is associated with the control box through which water passing to the water pipes flows. Probe means which may take varied forms is supported by the pipe section in a position so that water flows over the probe means in physical and electrical contact therewith. The probe means itself is insulated from the pipe section. The oscillating voltage wave form is applied to the probe means and pipe section by suitable first and second electrical leads passing from the control box to the probe means so that the oscillating voltage wave form appearing on the probe means inhibits charged ions of minerals in the water from adhering to the inner walls of the water pipes.

BRIEF DESCRIPTION OF THE DRAWINGS

A better understanding of the invention will be had by now referring to the accompanying drawings in which.

DETAILED DESCRIPTION OF THE INVENTION

Figure 1:
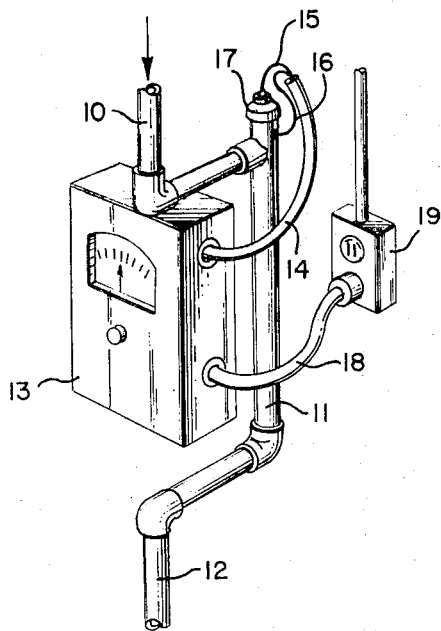
FIG. 1 is a perspective view of the apparatus for inhibiting scale formation in water pipes shown inserted in operative position within a water line.

Referring to FIG. 1, water passing through a pipe 10 is caused to flow through a branch system including a pipe section 11 and thence back into the main line by connection to pipe 12. A portable control box 13 is associated with the pipe section 11 and includes an outlet cable 14 housing first and second conductors 15 and 16. The first conductor 15 connects to a probe means 17 disposed within the pipe section 11 and the second conductor 16 is connected directly to the pipe section. Power for the control box 13 is provided by input power cord 18 connected to a conventional 110 volts 60 cycle outlet 19.

The pipes 10 and 12 of FIG. 1 would normally constitute a single flow pipe for water in any particular water system, such as water supplied to a steam generating plant or to a sprinkler system. It is a simple matter to break the water pipe at existing joints or, alternatively to simply cut and thread the pipes to insert the branch pipe arrangement including the pipe section 11.

Figure 2:
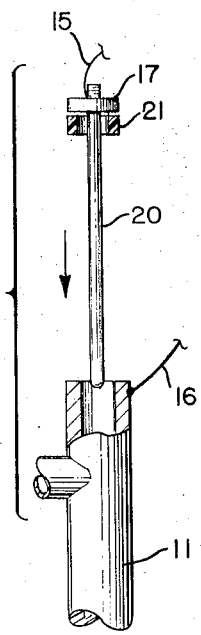
FIG. 2 is an exploded fragmentary cross section of a pipe section forming part of the apparatus of FIG. 1.

FIG. 2 illustrates in greater detail the pipe section 11 and associated probe means 17. Thus in the first embodiment illustrated, the probe means includes an elongated rod 20 which may comprise stainless steel arranged to be coaxially positioned within and supported by the pipe section 11. Insulating means 21 serves to insulate the probe from the pipe section at its point of support. The pipe section itself is preferably made of copper. The connection of the first and second leads 15 and 16 to the probe and pipe section is clearly illustrated in FIG. 2.

Figure 3:
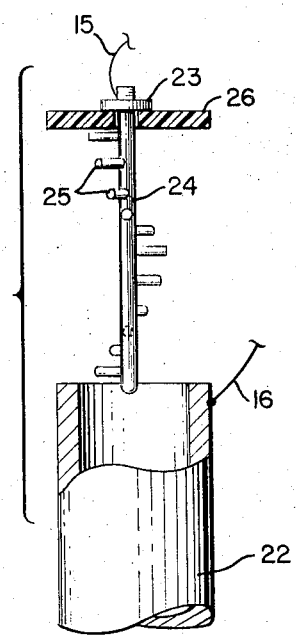
FIG. 3 is a view similar to FIG. 2 showing a modified probe means.

FIG. 3 shows a modified type of probe means used when the cooperating pipe section is of larger diameter as in larger diameter water piping systems. In this embodiment, the pipe section is illustrated at 22 with the modified probe means shown exploded therefrom. This modified probe means is indicated at 23 and includes an elongated rod 24 having a plurality of laterally extending probes 25 following a helical path over the rod. An insulating disc 26 again serves to electrically isolate the rod from the pipe section. By providing the laterally extending probes in addition to the coaxial rod, greater contact is assured between the flowing water and the probe.

Figure 4:
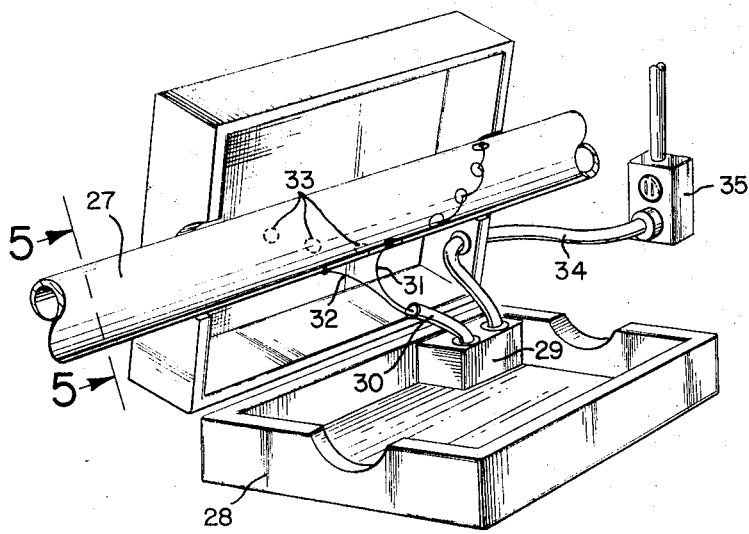
FIG. 4 is a perspective view of a control box and pipe section with a further modified type of probe means in accord with the invention.

FIG. 4 shows still another arrangement of the probe and pipe section. In this embodiment, the pipe section is shown at 27 and may be nestled within a housing 28 incorporating a control box 29 similar to the control box 13 of FIG. 1. An output cable 30 includes first and second leads 31 and 32 connecting respectively to probe means designated 33 and the pipe section 27. Power for the control box is derived from power cord 34 connecting to conventional 120 volt 60 cycle outlet 35.

Figure 5:
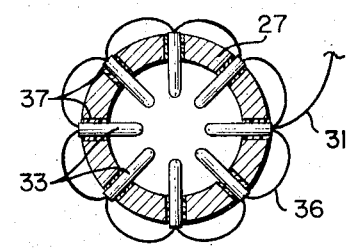
FIG. 5 is a cross section taken in the direction of the arrows 5—5 of FIG. 4.

Referring to the cross section of FIG. 5, it will be noted that the probe means 33 comprises a plurality of individual probes extending radially into the side of the pipe section 27. Each of the probes terminates short of the longitudinal axis of the pipe section as illustrated. It will also be noted by referring once again to FIG. 4 that the probes follow a helical path.

In the embodiment of FIGS. 4 and 5, the individual probes are all electrically connected together as by leads 36. In addition, insulating means 37 serves to insulate each individual probe from the side of the wall section through which it extends.

Figure 6:
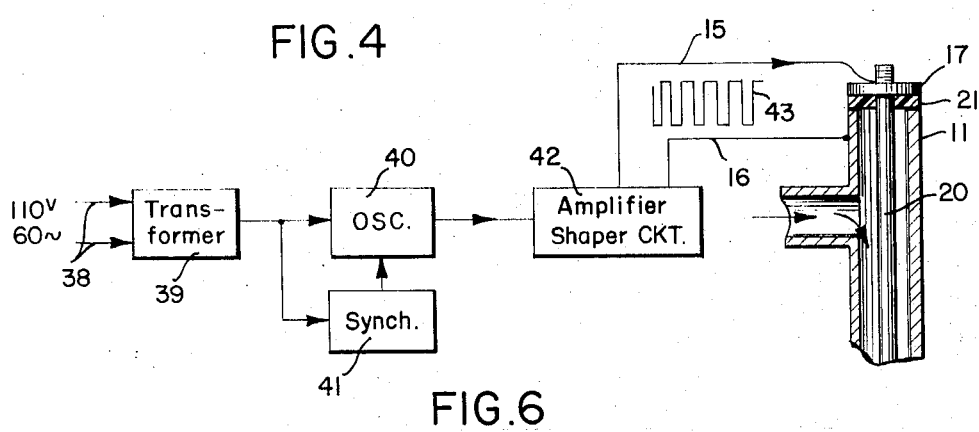
FIG. 6 is a block diagram of an oscillating wave form generating portion of the apparatus.

FIG. 6 illustrates in block form a means for generating an oscillating voltage wave form which is incorporated in the control box 13 or in the control box 29. Referring to the left of FIG. 6, conventional 110 volt 60 cycle electrical power is brought in through leads 38 to a step down transformer 39. The output of the step down transformer connects to an oscillator 40. Synchronizing means 41 are connected to the oscillator to synchronize the oscillating frequency thereof to a given multiple of the line frequency; that is, a given multiple of 60 cycles per second.

The oscillating voltage wave form from the oscillator 40 is then preferably passed through an amplifier and shaper circuit 42 for converting the wave form into a square wave such as schematically indicated at 43. This square wave which alternates in polarity is passed along the first and second leads 15 and 16 as described in FIG. 1 to connect to the probe means 17 and pipe section 11 respectively.

OPERATION

In operation, the pipe section 11 and associated probe is inserted in series in a water line such as comprised of the pipes 10 or 12 so that the probe means lies in the path of water flowing through the pipe section. In the case of the embodiment of FIG. 4, the pipe section 27 may actually constitute a portion of the piping system. The first and second output leads are then connected to the probe and the pipe section respectively as described heretofore and an oscillating wave form of given low frequency which alternates in polarity is provided thereon by the generating means within the associated control box.

In the preferred embodiment, the step down transformer described in FIG. 6 provides a low voltage of 12.6 volts. The frequency of the oscillator is set at 600 cycles per second; that is, a multiple of ten times the line frequency of 60 cycles. However, this frequency could range between 400 cycles and 900 cycles per second.

The final alternating square wave from the output of the amplifier and shaper circuit appears on the probe means and charges the probe means alternately positively and negatively at the given frequency. As a consequence of this alternating positive and negative charge on the probe means over which the water flows, charged ions of minerals in the water are inhibited from adhering to the inner walls of the water pipes so that the build up of scale is inhibited. It should be noted that since the wave form is applied between the probe and pipe section, the polarity of the pipe section alternates between positive and negative values relative to the probe.

Since only static charges are involved on the probe and there is substantially no current flow, very little power is required to operate the apparatus. Thus, for a minimum of expense and trouble, the pipe section and probe may be left in a continuously energized state to thereby continuously treat flowing water passing therethrough.

As mentioned heretofore, for larger diameter water pipe systems, the probe modification of FIG. 3 would be employed or, the radially extending probes described in FIGS. 4 and 5 may be used.

From the foregoing description, it will be evident that the present invention has provided an improved apparatus for inhibiting scale formation in water which substantially avoids problems associated with prior art systems.

What is claimed is:

1. An apparatus for inhibiting scale formation in water pipes comprising, in combination:
   a. a portable control box incorporating means for generating a square wave voltage of given low frequency no greater than 900 cycles per second which alternates in polarity;
   b. a pipe section associated with said control box through which water passing to the water pipes flows;
   c. probe means in the form of radially extending individual probes of cylindrical shape following a helical path positioned in and supported by said pipe section so that water flows over said probe means in physical and electrical contact therewith;
   d. electrical insulating means insulating the probe means from the pipe section at the point of support; and,
   e. first and second electrical leads passing from said control box to said probe means and said pipe section respectively to apply said square wave voltage to the probe means and pipe section so that the probe means is charged alternately positively and negatively at said given frequency to inhibit charged ions of minerals in the water from adhering to the inner walls of the water pipes.

2. An apparatus according to claim 1, in which said probe means comprises an elongated rod positioned coaxially within said pipe section for supporting said radially extending individual probes.

3. An apparatus according to claim 1, in which said individual probes extend radially into the side of said pipe section along said helical path; and electrical conductive means electrically connecting said probes together, said electrical insulating means insulating each individual probe from the side of the wall section through which it extends.

4. An apparatus according to claim 1, in which said probe means is made of stainless steel and said pipe section is made of copper and wherein said means for generating an oscillating voltage wave form includes: a step down transformer for converting conventional 120 volts 60 cycle power to a lower voltage; an oscillator connected to the output of said transformer; an amplifier and shaper circuit connected to the output of said oscillator so that said oscillating voltage wave form constitutes a square wave; and synchronizing means connected to the oscillator to synchronize the oscillating frequency thereof to a given multiple of the line frequency.

References Cited

UNITED STATES PATENTS

| | | | |
|---|---|---|---|
| 3,202,601 | 8/1965 | Green | 204—186 |
| 2,490,730 | 12/1949 | Dubilier | 204—149 |
| 1,773,275 | 8/1930 | Neeley | 204—302 |
| 438,579 | 10/1890 | Faunce, et al. | 204—186 |

FOREIGN PATENTS

| | | | |
|---|---|---|---|
| 606,154 | 8/1948 | Great Britain | 204—186 |
| 657,150 | 9/1951 | Great Britain | 204—186 |

THOMAS M. TUFARIELLO, Primary Examiner

U.S. Cl. X.R.

204—149